United States Patent
Mino et al.

[11] Patent Number: 6,023,397
[45] Date of Patent: Feb. 8, 2000

[54] MAGNETIC HEAD, AND ITS FABRICATION METHOD

[75] Inventors: Tetsuya Mino, Chiba; Yasufumi Uno, Nagano, both of Japan

[73] Assignee: TDK Corporation, Tokyo, Japan

[21] Appl. No.: 08/932,465

[22] Filed: Sep. 18, 1997

[30] Foreign Application Priority Data

Sep. 19, 1996 [JP] Japan .................................. 8-269448

[51] Int. Cl.$^7$ .............................. G11B 5/235; H01F 10/00
[52] U.S. Cl. .......................... 360/126; 148/306; 148/318; 360/113
[58] Field of Search ..................................... 360/110, 120, 360/121, 113, 126; 148/306, 317, 318

[56] References Cited

U.S. PATENT DOCUMENTS

| | | | |
|---|---|---|---|
| 5,117,321 | 5/1992 | Nakanishi et al. | 360/120 |
| 5,262,915 | 11/1993 | Terunuma et al. | 360/120 |
| 5,382,305 | 1/1995 | Terunuma et al. | 148/306 |
| 5,473,492 | 12/1995 | Terunuma et al. | 360/128 |

FOREIGN PATENT DOCUMENTS

| | | |
|---|---|---|
| 3-1513 | 1/1991 | Japan . |
| 6-259729 | 9/1994 | Japan . |
| 7-60767 | 6/1995 | Japan . |

*Primary Examiner*—William J. Klimowicz
*Attorney, Agent, or Firm*—Oblon, Spivak, McClelland, Maier & Neustadt, P.C.

[57] ABSTRACT

A magnetic pole or magnetic shielding film is constructed of a soft magnetic thin film that has a composition represented by formula $(Fe_{1-x}M_x)_{1-y}N_y$ wherein M is at least one element selected from the group consisting of magnesium, calcium, yttrium, titanium, zirconium, hafnium, vanadium, niobium, tantalum, chromium, molybdenum, tungsten, manganese, and boron, and an atomic ratio x is $0.01 \leq x \leq 0.1$ and an atomic ratio y is $0.01 \leq y \leq 0.1$. This soft magnetic thin film has a I(200)/I(110) ratio of 0.1 inclusive to 1 exclusive with the proviso that I(200), and I(110) represents an intensity of a diffraction peak for an iron (200) plane, and an iron (110) plane, respectively, as found from an X-ray diffraction pattern, and is substantially free from a diffraction peak for a nitride of the element M, as found from the X-ray diffraction pattern.

11 Claims, 3 Drawing Sheets

MAGNETIC HEAD, AND ITS FABRICATION METHOD

BACKGROUND OF THE INVENTION

The present invention relates to various magnetic heads including an induction type magnetic head, a magnetoresistance type magnetic head (MR head), and an MR induction type composite head having an induction head portion and an MR head portion, and their fabrication method.

In recent years, magnetic recording of much higher density than ever before has been put forward. With this, thin film magnetic heads using soft magnetic thin films as magnetic poles, and reproducing MR heads making use of magnetoresistance effect have been under remarkable developments.

An MR head is designed to read external magnetic signals through a resistance change in a reading sensor formed of magnetic material. A characteristic feature of the MR head is that high outputs are achievable even when magnetic recording is performed at high linear densities because outputs are not dependent on its relative speed with respect to a recording medium. To increase resolving power and obtain good-enough properties at high frequencies, the MR head is usually constructed by sandwiching a magnetoresistance film (an MR film) between a pair of magnetic shielding films (a shielded MR head).

For the MR head that is a reproducing head, an MR induction type composite head is used, in which an MR head portion is provided in the form of an integral piece of an induction type head portion for recording purposes.

For magnetic shielding films or magnetic poles in the MR heads or the MR induction type composite heads, it is preferable to use thin films excellent in soft magnetic properties. Fe—Zr—N base soft magnetic thin films set forth in JP-B 7-60767 and JP-A 3-1513, for instance, are available to this end.

MR films are generally of low heat resistance. In particular, multilayer films having giant magnetoresistance (GMR) effect (artificial lattice films composed of a laminate of thin films each having a thickness of about 5 nm) are likely to undergo considerable degradation because mutual dispersion occurs between thin films upon heated. It is thus required that annealing for the purpose of improving the soft magnetic properties of magnetic shielding films or magnetic poles be done at temperatures below 300° C.

JP-B 7-60767 discloses that a soft magnetic thin film having a coercive force of up to 1 Oe is obtained. However, the lowest annealing temperature described therein is 350° C. The publication states that, in order to obtain excellent soft magnetic properties, the relative intensity ratio of Fe (200) peak to Fe (110) peak should be at least 1 as found by X-ray diffractometry; in another parlance, it is essentially required that the thin film be subjected to preferential orientation on the (100) plane. Illustrated in FIG. 5 of the publication is an X-ray diffraction pattern of a soft magnetic thin film annealed at 600° C. As shown, the relative intensity ratio of Fe (200) peak to Fe (110) peak is 3.1. As also shown, there is a distinctive, broad peak for ZrN. Referring to a mechanism by which soft magnetic properties are improved, the publication states that the growth of crystal grains can be limited by the precipitation of fine grains of ceramics such as ZrN at an Fe grain boundary. To achieve the precipitation of fine grains of the ceramics at the Fe grain boundary, annealing at a temperature exceeding 300° C. is essentially needed. In addition, the precipitation of ZrN offers another problem, i.e., a drop of corrosion resistance due to the precipitation of α-Fe.

JP-A 3-1513 mentioned above discloses a soft magnetic thin film that is present in the form of an amorphous film immediately upon formation. When this amorphous film is annealed at 350° C. or higher, a low coercive force of 1 Oe or lower is obtained. However, as long as 4,800 minutes are needed for crystallization when annealing is carried out at 250° C. In addition, the coercive force obtained at that time is as high as 1.4 Oe. Illustrated in FIG. 11 of the publication is an X-ray diffraction pattern change due to a change in the annealing temperature. As can be seen from FIG. 11, a broad peak for Fe (200) is present when the annealing is carried out at a high temperature of 450° C. or greater. However, such an Fe (200) peak is not substantially observed when the annealing is performed in a region of temperature that is lower than 450° C. Also, the publication states that if the annealing temperature is at least 350° C., a coercive force of 10 Oe or lower is obtained while a diffraction peak for ZrN is observed. In other words, it is believed that in order that the soft magnetic thin film set forth in the publication has good-enough soft magnetic properties, the presence of ZrN is required as in the case of the soft magnetic thin film disclosed in JP-B 7-60767.

For both soft magnetic thin films set forth in JP-B 7-60767 and JP-A 3-1513 annealings at a temperature of 350° C. or higher are essentially required; in other words, they cannot be applied to magnetic shielding films, and magnetic poles in magnetic heads having MR films of low heat resistance. Thus, it is desired to develop a soft magnetic thin film which, even upon annealed at a temperature below 300° C., can have excellent soft magnetic properties.

JP-A 6-259729, too, describes a soft magnetic thin film having an Fe—Zr—N base composition. As described, this thin film is applied to a magnetic shielding film in MR heads or an MR induction type of composite heads. However, the publication does not show the application of the thin film to a magnetic pole in induction head portions. Moreover, while the publication provides no illustration of an X-ray diffraction pattern of the soft magnetic thin film, it states that the soft magnetic thin film should be subjected to preferential orientation on the (100) plane. The publication goes on that the soft magnetic thin film has an increased thermal stability because the growth of Fe crystal grains is limited by the formation of ZrN. In this soft magnetic thin film, too, ZrN is formed as is the case with JP-B 7-60767 and JP-A 3-1513.

However, JP-A 6-259729 says nothing about whether or not the soft magnetic thin film has been annealed. If any annealing is dispensed with, the soft magnetic thin film will be suitable for MR heads or an MR induction type of composite heads. However, experiments performed by the inventors indicate that it is very difficult to obtain thin films oriented on the (100) plane unless annealing is performed, and so most of them will be oriented on the (110) plane due to slight variations in film-forming conditions such as a partial pressure of nitrogen, power input, and the degree of vacuum at a reactive sputtering step. In the absence of annealing, it is impossible to form ZrN in a stable manner.

An object of the present invention is to prevent any degradation of MR films due to annealings of magnetic shielding films or magnetic poles in MR heads or an MR induction type of composite heads comprising a reproducing MR head portion and a recording induction head portion.

SUMMARY OF THE INVENTION

Such an object is achieved by the present invention defined as below (1) to (6).

(1) A magnetic head comprising an induction head portion having a pair of magnetic poles, wherein:

at least a portion of at least one of said magnetic poles is constructed of a soft magnetic thin film that has a composition represented by formula $(Fe_{1-x}M_x)_{1-y}N_y$, wherein M is at least one element selected from the group consisting of magnesium or Mg, calcium or Ca, yttrium or Y, titanium or Ti, zirconium or Zr, hafnium or Hf, vanadium or V, niobium or Nb, tantalum or Ta, chromium or Cr, molybdenum or Mo, tungsten or W, manganese or Mn, and boron or B, and an atomic ratio x is $0.01 \leq x \leq 0.1$ and an atomic ratio y is $0.01 \leq y \leq 0.1$, and has a I(200)/I(110) ratio of 0.1 inclusive to 1 exclusive with the proviso that I(200), and I(110) represents an intensity of a diffraction peak for an iron (200) plane, and an iron (110) plane, respectively, as found from an X-ray diffraction pattern, and is substantially free from a diffraction peak for a nitride of the element M, as found from the X-ray diffraction pattern.

(2) A magnetic head including a magnetoresistance head portion comprising a magnetoresistance film and at least one magnetic shielding film, wherein:

at least a portion of at least one of magnetic shielding films is constructed of a soft magnetic thin film that has a composition represented by formula $(Fe_{1-x}M_x)_{1-y}N_y$ wherein M is at least one element selected from the group consisting of magnesium, calcium, yttrium, titanium, zirconium, hafnium, vanadium, niobium, tantalum, chromium, molybdenum, tungsten, manganese, and boron, and an atomic ratio x is $0.01 \leq x \leq 0.1$ and an atomic ratio y is $0.01 \leq y \leq 0.1$, and has a I(200)/I(110) ratio of 0.1 inclusive to 1 exclusive with the proviso that I(200), and I(110) represents an intensity of a diffraction peak for an iron (200) plane, and an iron (110) plane, respectively, as found from an X-ray diffraction pattern, and is substantially free from a diffraction peak for a nitride of the element M, as found from the X-ray diffraction pattern.

(3) The magnetic head of the above (2), which comprises an induction head portion having a pair of magnetic poles in addition to said magnetoresistance head portion, at least a portion of at least one of said magnetic poles being constructed of said soft magnetic thin film.

(4) The magnetic head of the above (1), (2) or (3), wherein said soft magnetic thin film has been annealed at 100 to 280° C.

(5) A method for fabricating a magnetic head comprising an induction head portion having a pair of magnetic poles, wherein:

a thin film is first formed, which comprises iron, an element M that is at least one element selected from the group consisting of magnesium, calcium, yttrium, titanium, zirconium, hafnium, vanadium, niobium, tantalum, chromium, molybdenum, tungsten, manganese, and boron, and nitrogen, and has a I(200)/I(110) ratio of less than 0.1 with the proviso that I(200), and I(110) represents an intensity of a diffraction peak for an iron (200) plane, and an iron (110) plane, respectively, as found from an X-ray diffraction pattern, said thin film is then annealed at 100 to 280° C. into a soft magnetic thin film that has a composition represented by formula $(Fe_{1-x}M_x)_{1-y}N_y$ wherein M has the same meanings as defined above, and an atomic ratio x is $0.01 \leq x \leq 0.1$ and an atomic ratio y is $0.01 \leq y \leq 0.1$, and has a I(200)/I(110) ratio of 0.1 inclusive to 1 exclusive and is substantially free from a diffraction peak for a nitride of the element M, as found from an X-ray diffraction pattern, and said soft magnetic thin film is used for at least a portion of said at least one of said magnetic poles.

(6) A method for fabricating a magnetic head comprising a magnetoresistance head portion including a magnetoresistance film and at least one magnetic shielding film, wherein:

a thin film is first formed, which comprises iron, an element M that is at least one element selected from the group consisting of magnesium, calcium, yttrium, titanium, zirconium, hafnium, vanadium, niobium, tantalum, chromium, molybdenum, tungsten, manganese, and boron, and nitrogen, and has a I(200)/I(110) ratio of less than 0.1 with the proviso that I(200), and I(110) represents an intensity of a diffraction peak for an iron (200) plane, and an iron (110) plane, respectively, as found from an X-ray diffraction pattern, said thin film is then annealed at 100 to 280° C. into a soft magnetic thin film that has a composition represented by formula $(Fe_{1-x}M_x)_{1-y}N_y$ wherein M has the same meanings as defined above, and an atomic ratio x is $0.01 \leq x \leq 0.1$ and an atomic ratio y is $0.01 \leq y \leq 0.1$, and has a I(200)/I(110) ratio of 0.1 inclusive to 1 exclusive and is substantially free from a diffraction peak for a nitride of the element M, as found from an X-ray diffraction pattern, and said soft magnetic thin film is used for at least a portion of said at least one magnetic shielding film.

BRIEF EXPLANATION OF THE DRAWINGS

By way of illustration but not by way of limitation, the present invention will now be explained more specifically with reference to the accompanying drawings, in which.

DETAILED EXPLANATION OF THE PREFERRED EMBODIMENTS

Figure 1:
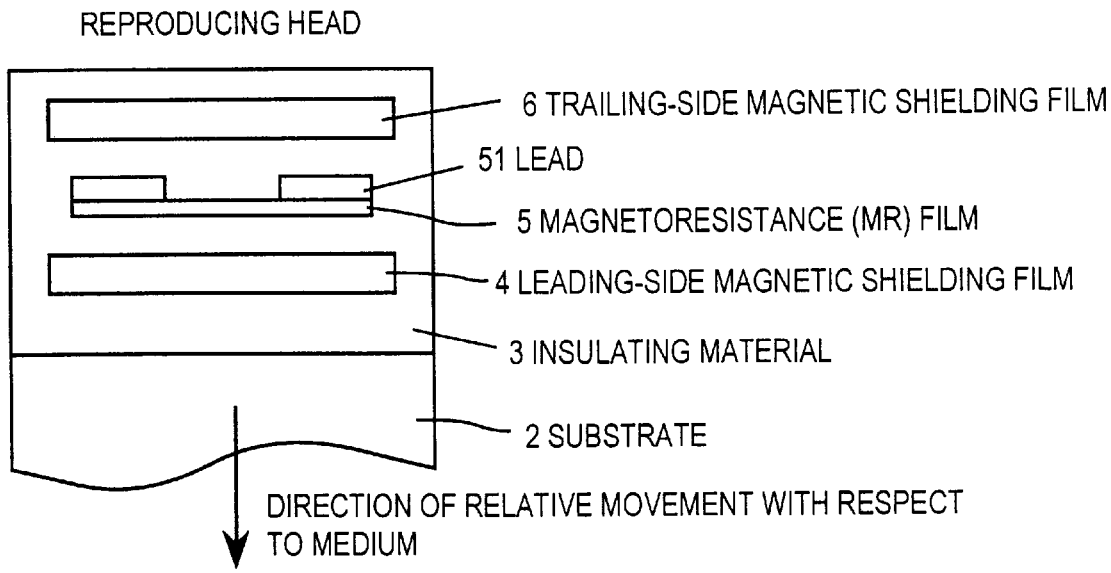
FIG. 1 is a plan view of one exemplary magnetic head arrangement of the present invention, as taken from a medium side thereof.

The Fe—Zr—N base soft magnetic thin film formed according to the present invention may be applied to a magnetic pole or magnetic shielding film in MR heads or an MR induction type of composite heads. A conventional Fe—Zr—N base soft magnetic thin film is found to cause considerable degradation of an MR film in a magnetic head comprising an MR head portion, because it must be annealed at a temperature of at least 350° C. to obtain good-enough soft magnetic properties. However, the soft magnetic thin film formed according to the present invention can successfully make an MR film unlikely to undergo degradation, because the thin film is annealed at a temperature low-enough to ensure prevention of degradation of the MR film. Since a magnetic shielding film 6 on a trailing side is formed after the formation of a magnetoresistance (MR) film 5 as shown typically in FIG. 1, the MR film is also heated when the magnetic shielding film on the trailing side is annealed. For this reason, the aforesaid soft magnetic thin film is particularly suitable for use on the trailing-side magnetic shielding film in an MR head portion. For similar reason, the soft magnetic thin film is also suitable for use on magnetic poles 81 and 82 on leading and trailing sides, respectively.

In addition, the aforesaid soft magnetic thin film, albeit having been annealed at such a low temperature, can have soft magnetic properties equivalent to or higher than those of a conventional Fe—Zr—N base soft magnetic thin film. To obtain satisfactory soft magnetic properties by the low-temperature annealing, it is essentially required that the diffraction peak intensity ratio, I(200)/I(110), as found from an X-ray diffraction pattern, be within the aforesaid ranges immediately after film formation and after the annealing, respectively.

The invention set forth in JP-A 3-1513 is similar to the present invention in that any Fe (200) peak is not present before the annealing, as can be seen from FIG. 11 of the publication. The Fe (200) peak is not substantially found even upon annealed at 250° C., and I(200)/I(110) does not reach 0.1 even upon annealed at 500° C. Neither are satisfactory soft magnetic properties obtained upon annealed 250° C., as already mentioned. This appears to be due to the fact that the nitrogen content is too high.

The soft magnetic thin film set forth in JP-A 6-259729 already takes the form of a crystallized film oriented on the (100) plane upon formed. In this regard, this thin film is distinguishable from that according to the present invention. As already stated, it is very difficult to stably form the crystallized film that is oriented as mentioned above.

The soft magnetic thin film formed according to the present invention is hardly elongated due to its low ductility. In this regard, this soft magnetic thin film is suitable for the magnetic shielding film on the leading side. When a permalloy film is used for the magnetic shielding film on the leading side, the permalloy film is elongated owing to coming in contact or collision with a recording medium such as a hard disk, often giving rise to a short circuit between it and an MR film. By use of the aforesaid soft magnetic film, however, it is possible to prevent such a short circuit and so achieve excellent durability. A sendust film of low ductility, too, causes damage to an MR film because the sendust film must be annealed at 400° C. or higher so as to obtain soft magnetic properties. In contrast, the aforesaid soft magnetic thin film has little, if any, influence on the MR film because only annealing at a temperature below 300° C. is needed. In addition, magnetic shielding properties obtained by use of this soft magnetic thin film are equivalent to or higher than those obtained by use of a permalloy film, or a sendust film which has been annealed at a high temperature.

A conventional Fe—Zr—N base soft magnetic thin film offers a certain problem in connection with corrosion resistance because the precipitation of ZrN induces the precipitation of α-Fe, as described above. However, the soft magnetic thin film according to the present invention has good-enough corrosion resistance because of no precipitation of ZrN. Therefore, this soft magnetic thin film is unlikely to undergo corrosion even when water is used in magnetic head fabrication processes.

Some preferred embodiments of the present invention will now be explained at great length.

In the practice of the present invention, the soft magnetic thin film having a composition represented by the following formula is used for a magnetic pole or magnetic shielding film in a magnetic head.

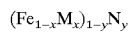

Here M is at least one element selected from the group consisting of magnesium or Mg, calcium or Ca, yttrium or Y, titanium or Ti, zirconium or Zr, hafnium or Hf, vanadium or V, niobium or Nb, tantalum or Ta, chromium or Cr, molybdenum or Mo, tungsten or W, manganese or Mn, and boron or B, with the proviso that M is preferably at least one element selected from the group consisting of Zr, V, Ta and Ti, and more preferably Zr. It is preferable that the element M contains at least 20 at % of Zr. N is nitrogen. The atomic ratio x is $0.01 \leq x \leq 0.1$ and preferably $0.02 \leq x \leq 0.09$, and the atomic ratio y is $0.01 \leq y \leq 0.1$ and preferably $0.02 \leq y \leq 0.09$.

The soft magnetic thin film of the present invention has a I(200)/I(110) ratio of 0.1 inclusive to 1 exclusive, and preferably 0.15 to 0.8 inclusive with the proviso that I(200), and I(110) represents an intensity of a diffraction peak for an Fe (200) plane, and an Fe (110) plane, respectively, as found by X-ray diffractometry. Preferably, the soft magnetic thin film is substantially free from a diffraction peak for a nitride of the element M such as ZrN, as found by X-ray diffractometry.

Herein let 2θ (θ is the diffraction angle) denote the position of each peak when a CuK α-beam is used for X-ray diffractometry. Then, 2θ is about 65° for Fe (200), about 44° for Fe (110), and about 39° for ZrN (200).

The element M, especially Zr is effective for keeping the I(200)/I(110) ratio within the scope defined herein. The element M is also effective to cooperate with nitrogen or N to refine crystals.

When the value of x in the above formula is too small, it is impossible to achieve good-enough soft magnetic properties due to too large a grain size. Furthermore, thermal stability, and corrosion resistance becomes worse. When the value of x is too large, on the other hand, high-temperature annealing is needed for crystallization. Even if crystallization is somehow carried out, it is impossible to achieve good-enough soft magnetic properties. Furthermore, it is impossible to obtain high saturation flux density.

When the value of y in the above formula is too small, no good-enough soft magnetic properties are obtainable because the refinement of crystal grains by N becomes insufficient. When the value of y is too large, the annealing for crystallization should be continued at a low temperature over a practically unacceptably long period of time. In addition, even if crystallization is somehow carried out, it is impossible to obtain good-enough soft magnetic properties.

In the practice of the present invention, it is noted that the soft magnetic thin film may contain up to 5 at % of oxygen as a whole.

The composition of the soft magnetic thin film may be determined by the Electron Probe Micro Analysis (EPMA) method, for instance.

The aforesaid soft magnetic thin film can have excellent soft magnetic properties. Specifically, an initial permeability of at least 1,000 at 10 MHz and a coercive force of up to 1 Oe can be obtained with a saturation flux density of at least 14,000 G.

In the practice of the present invention, the soft magnetic thin film may be formed by means of various vapor phase techniques such as evaporation, sputtering, ion plating, and CVD, among which sputtering is most preferred. With sputtering, for instance, a thin film is prepared in the following procedure. At a reactive sputtering step, sputtering is performed in an argon or other inert gas atmosphere, using a cast alloy target or multiple targets and employing nitrogen as a reactive gas. Preferably, the sputtering atmosphere contains nitrogen in an amount of 0.1 to 15% by volume, and particularly 2 to 10% by volume. At too high or too low a nitrogen content, it is difficult to obtain a thin film which is excellent in soft magnetic properties, because difficulty is involved in allowing y in the composition formula to have a value within the scope of the present invention.

No particular limitation is imposed on how to perform sputtering as well as on sputtering systems used. It is preferable, however, to use magnetron sputtering. In the practice of the present invention, either DC magnetron sputtering or RF magnetron sputtering may be used. It is noted that the working pressure may be usually on the order of about 0.05 to 1.0 Pa. Various conditions such as power input for sputtering may be optionally determined.

A thin film formed by sputtering is usually of approximately amorphous nature, and shows a broad peak coming from the Fe (110) plane but does not substantially show any peak derived from the Fe (200) plane. It is then preferred that the peak intensity ratio, I(200)/I(110), is less than 0.1. This peak intensity ratio is increased to the range defined above by subsequent annealing.

The thus formed thin film is annealed to promote the crystallization of the film, thereby obtaining good-enough soft magnetic properties. This annealing is carried out at preferably 100 to 280° C. and more preferably 120 to 260° C. for preferably 0.5 to 20 hours and more preferably 2 to 8 hours. At too low an annealing temperature the crystallization of the film becomes insufficient, and so the film cannot have good-enough soft magnetic properties. Too high a annealing temperature, on the other hand, has a thermally adverse influence on other members in a magnetic head, especially an MR film. Especially for a multilayer structure comprising laminated thin films, the annealing should essentially be carried out at such a low temperature. This is because heating makes elements likely to diffuse mutually among the films due to their very small thinness. By heat treating the film having the aforesaid composition at such a low temperature the Fe (200) peak is allowed to appear, so that the I(200)/I(110) ratio can be increased to the range defined herein. Thus, excellent soft magnetic properties are obtainable. It is noted that too high an annealing temperature offers another problem; that is, it gives rise to a corrosion resistance drop due to the precipitation of $\alpha$-Fe incidental to the precipitation of FeN.

Preferably, the annealing is carried out in vacuo or in an argon or other inert gas atmosphere.

The thin film has a mean grain size of up to 100 nm upon annealed. In this regard, it is easy to achieve a mean grain size of 5 to 50 nm. The mean grain size may be determined by inserting the half bandwidth, $W_{50}$, of the Fe (200) peak measured by X-ray diffractometry in the following Scherrer's equation:

$$D = 0.9 \lambda / W_{50} \cos \theta$$

wherein $\lambda$ is the wavelength of the X-ray used, and $\theta$ is the diffraction angle.

An account will hereinafter be given of some constructions of the magnetic head according to the present invention.

FIG. 1 illustrates one exemplary construction of the magnetoresistance (MR) head according to the present invention. FIG. 1 is a plan schematic of the head as taken from a magnetic recording medium side, with a downward arrow indicating the direction of relative movement of the head with respect to the medium. A leading side is defined by a lower side of the head while a trailing side is defined by an upper side of the head. The reproducing head shown in FIG. 1 comprises, in order from a substrate 2 toward the trailing side, a magnetic shielding film 4 on the leading side, an MR film 5 having a pair of leads 51 connected thereto, and a magnetic shielding film 6 on the trailing side, with an insulating layer 3 provided between adjacent films.

The aforesaid soft magnetic thin film may be applied to either the magnetic shielding film on the leading side or the magnetic shielding film on the trailing side. However, it is preferable to apply two such thin films to both magnetic shielding films.

Figure 2:
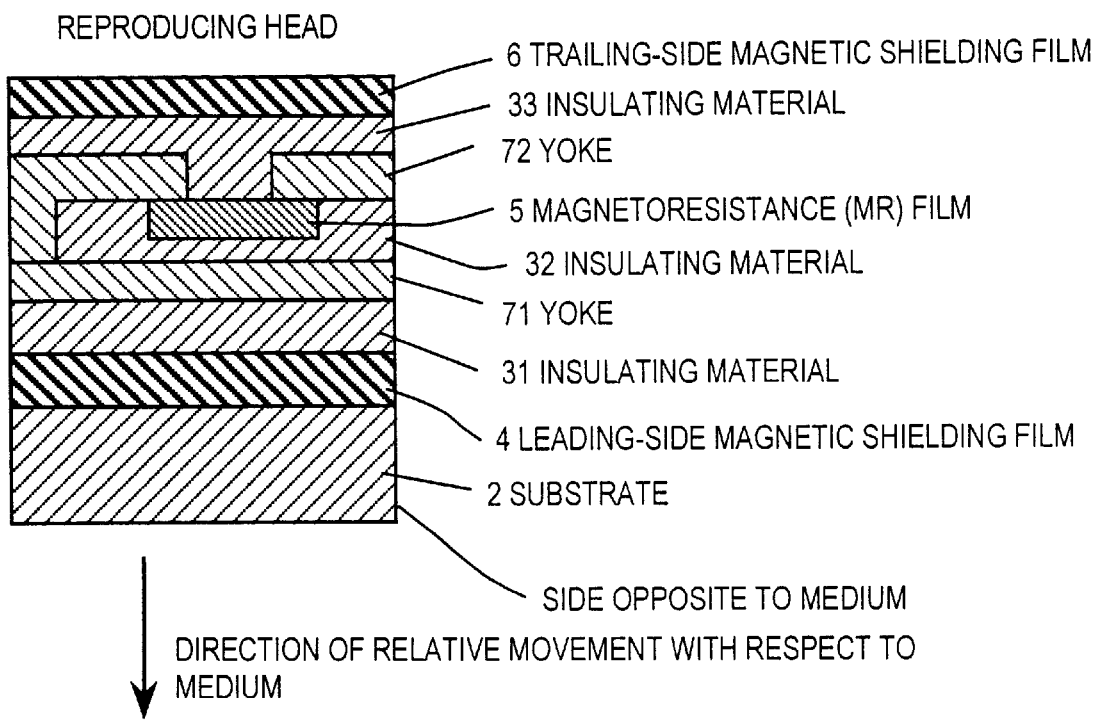
FIG. 2 is a sectional view of one exemplary MR head arrangement of the present invention.

It is noted that the reproducing head shown in FIG. 1 is an ordinary shielded MR head with the MR film 5 exposed on the side of the medium opposite thereto; however, the present invention may be applied to a yoke type MR head such as one shown in FIG. 2. The reproducing head shown in FIG. 2 comprises, in order from a substrate 2 toward a trailing side, a magnetic shielding film 4 on a leading side, an insulating material 31, a yoke 71, an insulating material 32, an MR film 5, a yoke 72, an insulating material 33, and a magnetic shielding film 6 on the trailing side. In this reproducing head, its right-handed side defines a side opposite to a medium, and a magnetic flux passes through the yoke 71, MR film 5, and yoke 72.

The aforesaid soft magnetic thin film is also suitable for an MR induction type of composite head comprising a recording induction head portion and a reproducing MR head portion.

Figure 3:
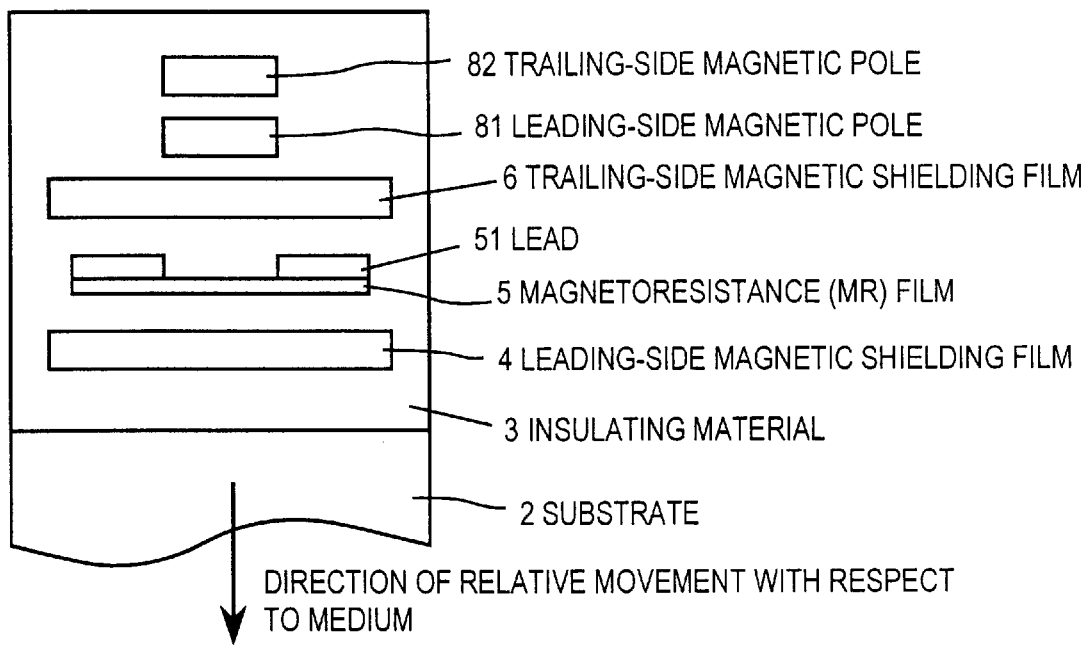
FIG. 3 is a plan view of one exemplary magnetic head of the present invention, as taken from a medium side thereof.

A recording/reproducing head shown in FIG. 3 is one example of the MR induction type composite head in which an induction head portion is provided on the trailing side of the reproducing head shown in FIG. 1 with an insulating material located between them. This induction head portion has an ordinary thin film head construction comprising a magnetic pole 81 on a leading side and a magnetic pole 82 on the trailing side.

Figure 4:
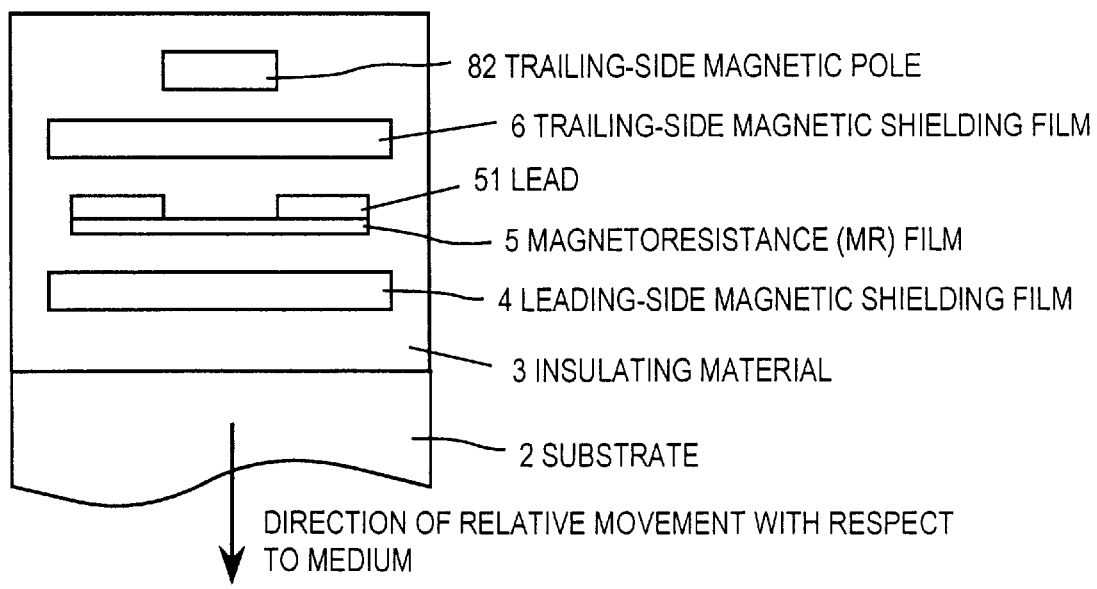
FIG. 4 is a plan view of one exemplary magnetic head of the present invention, as taken from a medium side thereof.

In a recording/reproducing head shown in FIG. 4, on the other hand, the trailing-side magnetic shielding film 6 in the reproducing head shown in FIG. 1 is used as a leading-side magnetic pole in an induction head portion thereof, and a trailing-side magnetic pole 82 for the induction head portion is located on a trailing side thereof.

When the present invention is applied to these induction head portions, the aforesaid soft magnetic thin film is used as a magnetic pole. Preferably in this case, two such soft magnetic thin films are applied to both magnetic poles although one such soft magnetic film may be applied to either the magnetic pole on the leading side or the magnetic pole on the trailing side. In any case, it is not always required that the magnetic pole on the leading or trailing side be overall constructed of the aforesaid soft magnetic thin film. For instance, the magnetic pole may be constructed by the lamination of the aforesaid soft magnetic film and other soft magnetic thin film such as a permalloy thin film, and the soft magnetic thin film, which is higher in flux density than the other thin film, may be located on a gap side. With such an arrangement, it is possible to achieve sharper flux changes in the vicinity of the gap.

In these magnetic heads, constructions of parts other than the magnetic shielding films and magnetic poles are not critical, and so may be similar to those of MR heads or an MR induction type of composite heads ordinarily used so far in the art.

For instance, not only permalloy or Ni—CO alloys but also various materials having magnetoresistance effect may be used for the MR film. As already mentioned, the present invention is particularly suitable for a multilayer MR film construction because the annealing can be carried out at a low temperature. Exemplary multilayer MR film includes spin valve type films (formed of NiFe/Cu/NiFe/FeMn, Co/Cu/Co/FeMn, etc.), and artificial lattice multilayer films (formed of NiFe/Ag, Co/Ag, etc.).

For the leads connected to the MR film, it is preferred to use tantalum, tungsten or other material which does not diffuse into the MR film. For the insulating materials use may be made of ordinary insulating materials such as various ceramics represented by $Al_2O_3$, and $SiO_2$. The substrate 2 formed as of ceramics is usually fixed to a slider in the magnetic head; however, it is possible to use the substrate 2 per se as the slider.

If necessary, a portion of the magnetic shielding film may be formed of a variety of conventional soft magnetic materials such as permalloy.

The size of each part in the magnetic head is not critical, and so may be determined depending on the construction of the magnetic recording medium used therewith. Usually, the magnetic shielding film is 1 to 5 μm in thickness and 30 to 200 μm in width, the magnetoresistance film is 5 to 60 nm in thickness and 1 to 10 μm in width, the distance between the magnetic shielding film and the magnetoresistance film is 0.03 to 1.0 μm, the magnetic pole in the induction head portion is 1 to 5 μm in thickness and 0.5 to 10 μm in width, and the distance between the trailing-side magnetic shielding film and the magnetic pole in the induction head portion is 0.2 to 5 μm.

How to operate the MR film in the MR head portion in a linear fashion is not critical. A choice may be made among current bias, hard film bias, soft film bias, shape bias, and other suitable fashions.

The aforesaid magnetic head is usually fabricated by thin film fabrication, and pattern lithography. Each film may be fabricated by suitable techniques such as sputtering, vapor phase evaporation such as vacuum evaporation, and plating. The pattern lithography may be carried out by selective etching, selective deposition, or the like.

The magnetic head of the present invention is used in combination with a well-known assembly such as an arm.

The present invention will now be explained in further detail with reference to some specific examples.

Thin Film

A thin film having a composition shown in Table 1 was formed on a glass substrate in the following procedure. It is noted that used for the substrate was an $Al_2O_3$—TiC plate with an $Al_2O_3$ film formed on its surface. An Fe—Zr—N thin film of 1.0 μm in thickness was first formed on the substrate by reactive sputtering using an Fe—Zr alloy as a target while a gaseous mixture of Ar+$N_2$ was introduced into a vacuum tank. For sputtering, the flow ratio $N_2/(Ar+N_2)$ was 0.05 to 0.10. Then, the thin film was annealed at 250° C. for 5 hours.

After the annealing, each thin film was measured for coercive force, initial permeability at 10 MHz, and saturation flux density. The results are shown in Table 1.

Figure 5:
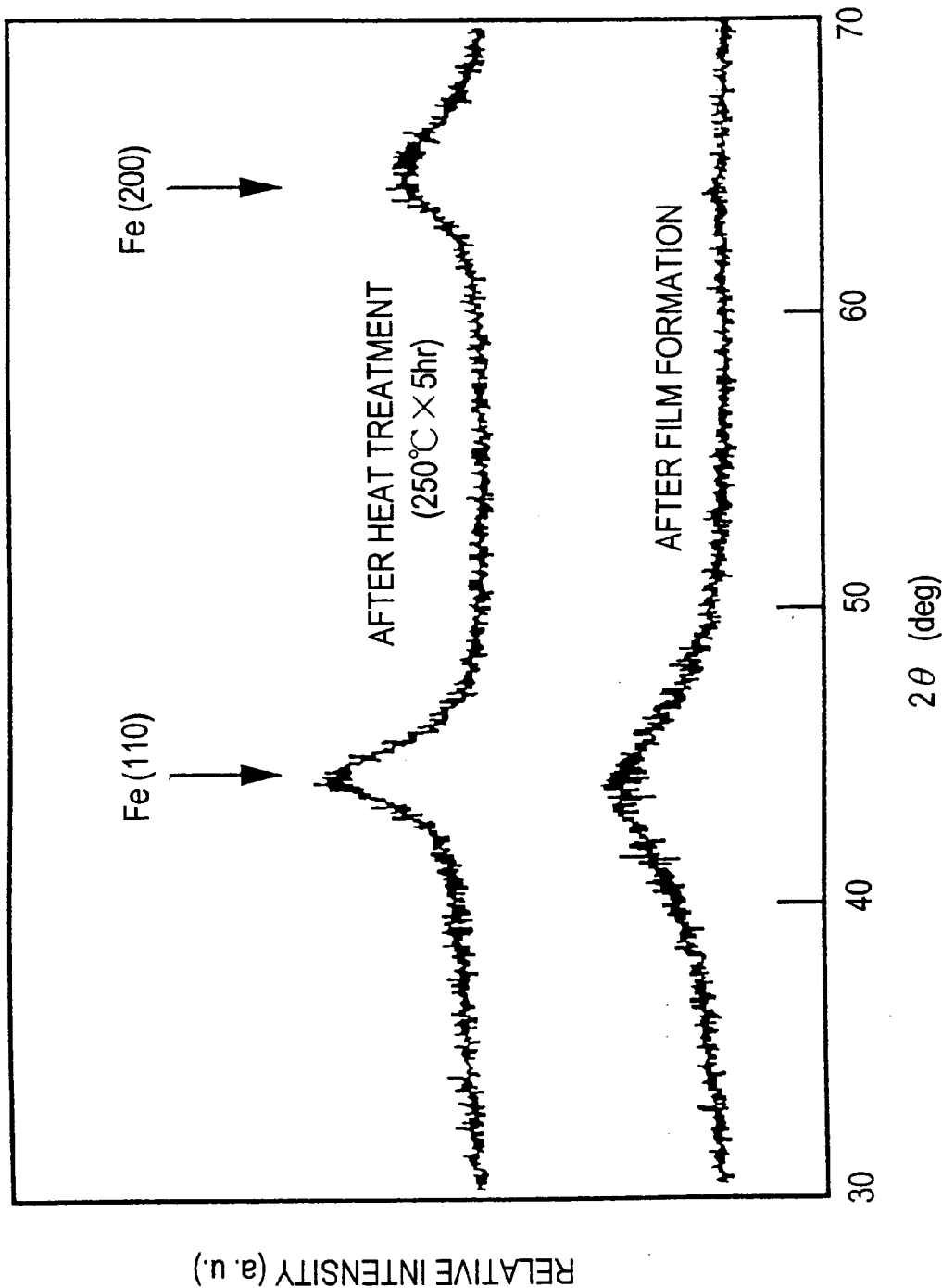
FIG. 5 shows X-ray diffraction patterns of an Fe—Zr—N thin film, as found before and after annealing.

The I(200)/I(110) ratio was found from the X-ray diffraction pattern of each film. The results are shown in Table 1. Shown in FIG. 5 are X-ray diffraction patterns of thin film No. 1 as obtained before and after the annealing.

TABLE 1

| Thin Film No. | Composition (at %) | | | Saturation Flux Density (G) | Coercive Force (Oe) | Initial Permeability (at 10 MHz) | I(200)/I(110) |
|---|---|---|---|---|---|---|---|
| | Fe | Zr | N | | | | |
| 1 | 88.95 | 7.00 | 4.05 | 17,800 | 0.2 | 3,500 | 0.27 |
| 2 | 85.95 | 5.93 | 8.12 | 17,800 | 0.5 | 2,900 | 0.35 |

From the results shown in Table 1, the advantages of the present invention will be appreciated. The thin films with their composition and I(200)/I(110) lying within the ranges defined herein have very excellent soft magnetic properties, i.e., low coercive force and high initial permeability, albeit having been annealed at as low as 250° C.

Thin film No. 1 is found to be free from any diffraction peak for ZrN, as shown in FIG. 5. This is true of another thin film, too.

For the purpose of comparison, a thin film having a composition with a high nitrogen content (77.7Fe-6.8Zr-15.5N in at %) or a thin film corresponding to the soft magnetic thin film set forth in JP-A 3-1513 was formed by means of reactive sputtering according to the thin film fabrication method shown in Table 1. This thin film was annealed at 250° C. However, it was after lapse of 70 hours, not 5 hours that the film was crystallized. In addition, the properties of the film upon crystallized were very poor as expressed by a coercive force of 27 Oe and an initial permeability of 80.

Apart from this, it was attempted to form (100) oriented thin films set forth in JP-A 6-259729 by using three types of reacting sputtering systems and varying reactive sputtering conditions such as sputtering rate, atmospheric pressure, and partial pressure of nitrogen gas. Only one of ten film-formation trials made under varying conditions somehow provided a (100) oriented thin film.

MR Induction Type Composite Head

An MR induction type composite head of the structure shown in FIG. 3 was fabricated.

Formed on the substrate 2 ($Al_2O_3$—TiC) in the first place were an insulating material ($Al_2O_3$ of 10 μm in thickness), the leading-side magnetic shielding film 4 (having the composition of thin film No. 1 shown in Table 1 and a thickness of 3 μm), an insulating material ($Al_2O_3$ of 0.1 μm in thickness), the MR film 5 (a three-layer structure of 15-nm thick bias film/7-nm thick Ta film/17-nm thick NiFe film with a total thickness of 39 nm and a height of 2.0 μm), the leads 51 (Ta of 0.2 μm in thickness), an insulating material ($Al_2O_3$ of 0.1 μm in thickness), the trailing-side magnetic shielding film 6 (having the composition of thin film No. 1 shown in Table 1 and a thickness of 2.5 μm), and an insulating material ($Al_2O_3$ of 3 μm in thickness). Both magnetic shielding films were formed by reactive sputtering, and then annealed at 250° C. for 5 hours. The MR film, insulating materials, and leads were formed by sputtering while ion milling was used for pattern lithography.

Then, the leading-side magnetic pole 81 (having the composition of thin film No. 1 shown in Table 1 and a thickness of 2.5 μm) was formed by means of reactive sputtering and annealed at 250° C. for 5 hours. Following this, an insulating material ($Al_2O_3$ of 0.5 μm in thickness) was formed by sputtering to form a gap, and the trailing-side magnetic pole 82 (having the composition of thin film No. 1 shown in Table 1 and a thickness of 3 μm) was formed by means of reactive sputtering, followed by a five-hour annealing at 250° C. Then, an insulating material ($Al_2O_3$ of 50 μm in thickness) was formed by sputtering into a protective film, thereby obtaining an MR induction type composite head. Finally, this MR induction type composite head was fixed at the substrate 2 to a slider for incorporation into a hard disc driver.

It is noted that the annealings for each magnetic shielding film and each magnetic pole were carried out in vacuo with the application thereto of a magnetic field of 3 kOe parallel with their film surfaces.

Half-Amplitude of Wave Form Upon Reproduced

To see whether the shielding effect was good or not, the half-amplitude of the solitary wave form upon reproduced in the MR induction composite head according to the present invention was measured. For the purpose of comparison, a head was made following the head of the present invention with the exception that both magnetic shielding films were formed of permalloy (Ni—Fe). This comparative head, too, was similarly measured. The results are shown in Table 2.

TABLE 2

| Magnetic Shielding Film | Half-Amplitude of Solitary Wave upon Reproduced (nm) |
|---|---|
| Fe—Zr—N (invention) | 380 |
| Ni—Fe (comparison) | 380 |

From Table 2, it is found that the head of the present invention can have magnetic shielding effect equivalent to that of the conventional permalloy head.

Durability

Each head used for the measurement of the half-amplitude of the wave form upon reproduced was lapped on the surface opposite to the recording medium by means of a diamond slurry to measure the amount of recess in the leading-side magnetic shielding film together with the amount of recess in the insulating material ($Al_2O_3$). The results are shown in Table 3.

TABLE 3

| Composition of Thin Film | Amount of Recess after Lapping (nm) |
|---|---|
| Fe—Zr—N (invention) | 4.2 |
| $Al_2O_3$ (comparison) | 4.0 |
| Ni—Fe (comparison) | 10.0 |

From Table 3, it is found that the magnetic shielding film in the head of the present invention has durability equivalent to that of the insulating material.

Dependence of Output on Recording Current

Using the MR induction type composite head of the present invention, the dependence of outputs on recording current was measured. For the purpose of comparison, a head was made following the head of the present invention with the exception that both magnetic poles were formed of permalloy (Ni—Fe). This comparative head, too, was similarly measured. The results are shown in Table 4.

TABLE 4

| Recording Current (mAop) | Output (mVpp) Fe—Zr—N (invention) | Ni—Fe (comp.) |
|---|---|---|
| 5 | 0.08 | 0.08 |
| 10 | 0.24 | 0.25 |
| 26 | 0.355 | 0.24 |
| 30 | 0.36 | 0.165 |
| 40 | 0.375 | 0.135 |

From Table 4, it is found that the head of the present invention increases in output with an increase in the recording current due to the high saturation flux density of the magnetic poles, and this is in sharp contrast to the comparative head having the permalloy magnetic poles, which decreases in output with an increase in the recording current due to the magnetic saturation of the magnetic poles.

The aforesaid measurements clarify the advantages of the present invention. The head of the present invention wherein the Fe—Zr—N thin films annealed at low temperatures are applied to the magnetic shielding films can have magnetic shielding properties equivalent to those achieved with the conventional head with permalloy magnetic shielding films. In addition, the thin film of the present invention is much higher in durability than the permalloy film. The head of the present invention wherein the aforesaid thin films are applied to the magnetic poles is more excellent in recording properties than the conventional head with permalloy magnetic poles, and has good durability as is the case with the application of the thin films to the magnetic shielding films.

Provided for the fabrication of the aforesaid magnetic head was the step of cutting the substrate after the formation of the soft magnetic thin film while water was jetted thereto. However, it was found that the soft magnetic thin film in the magnetic head is substantially free of corrosion when the annealing is done at 250° C. When the thin film having the same composition was annealed at 350° C., in contrast, it was observed that the soft magnetic thin film in the magnetic head is rusted probably due to the oxidation of α-Fe.

It was noted that even when the present invention is applied to magnetic heads of the structures shown in FIGS. 1, 2 and 4, similar results as mentioned above are obtained.

We claim:

1. A magnetic head comprising an induction head portion having a pair of magnetic poles, wherein:

at least a portion of at least one of said magnetic poles is constructed of a soft magnetic thin film that has a composition represented by $(Fe_{1-x}M_x)_{1-y}N_y$ wherein M is at least one element selected from the group consisting of magnesium, calcium, yttrium, titanium, zirconium, hafnium, vanadium, niobium, tantalum, chromium, molybdenum, tungsten, manganese, and boron, and an atomic ratio x is $0.01 \leq x \leq 0.1$ and an atomic ratio y is $0.01 \leq y \leq 0.1$, and has a I(200)/I(110) ratio of 0.1 inclusive to 1 exclusive with the proviso that I(200), and I(110) represents an intensity of a diffraction peak for an iron (200) plane, and an iron (110) plane, respectively, as found from an X-ray diffraction pattern, and is substantially free from a diffraction peak for a nitride of the element M, as found from the X-ray diffraction pattern.

2. The magnetic head of claim 1, wherein said soft magnetic thin film has been annealed at 100 to 280° C.

3. The magnetic head according to claim 1, wherein the X-ray diffraction pattern of the soft magnetic thin film is free from the diffraction peak for the nitride of the element M.

4. A method for fabricating a magnetic head comprising an induction head portion having a pair of magnetic poles, the method comprising forming a thin film comprising iron, an element M that is at least one element selected from the group consisting of magnesium, calcium, yttrium, titanium, zirconium, hafnium, vanadium, niobium, tantalum, chromium, molybdenum, tungsten, manganese, and boron, and nitrogen, the film having a I(200)/I(110) ratio of less than 0.1 with the proviso that I(200), and I(110) represents an intensity of a diffraction peak for an iron (200) plane, and an iron (110) plane, respectively, as found from an X-ray diffraction pattern;

annealing said thin film at 100 to 280° C. into a soft magnetic thin film that has a composition represented by $(Fe_{1-x}M_x)_{1-y}N_y$ wherein M has the same meanings as defined above, and an atomic ratio x is $0.01 \leq x \leq 0.1$ and an atomic ratio y is $0.01 \leq y \leq 0.1$, and has a I(200)/I(110) ratio of 0.1 inclusive to 1 exclusive and is substantially free from a diffraction peak for a nitride of the element M, as found from an X-ray diffraction pattern;

using said soft magnetic thin film to form at least a portion of at least one of said magnetic poles; and forming the magnetic head according to claim 1.

5. The magnetic head according to claim 4, wherein the X-ray diffraction pattern of the soft magnetic thin film is free from the diffraction peak for the nitride of the element M.

6. A magnetic head including a magneto resistance head portion comprising a magneto resistance film and at least one magnetic shielding film, wherein:

at least a portion of the at least one magnetic shielding film is constructed of a soft magnetic thin film that has a composition represented by $(Fe_{1-x}M_x)_{1-y}N_y$ wherein M is at least one element selected from the group consisting of magnesium, calcium, yttrium, titanium, zirconium, hafnium, vanadium, niobium, tantalum, chromium, molybdenum, tungsten, manganese, and boron, and an atomic ratio x is $0.01 \leq x \leq 0.1$ and an atomic ratio y is $0.01 \leq y \leq 0.1$, and has a I(200)/I(110) ratio of 0.1 inclusive to 1 exclusive with the proviso that I(200), and I(110) represents an intensity of a diffraction peak for an iron (200) plane, and an iron (110) plane, respectively, as found from an X-ray diffraction pattern, and is substantially free from a diffraction peak for a nitride of the element M, as found from the X-ray diffraction pattern.

7. The magnetic head of claim 6, which comprises an induction head portion having a pair of magnetic poles in addition to said magnetoresistance head portion, at least a portion of at least one of said magnetic poles being constructed of said soft magnetic thin film.

8. The magnetic head of claim 6, wherein said soft magnetic thin film has been annealed at 100 to 280° C.

9. The magnetic head according to claim 6, wherein the X-ray diffraction pattern of the soft magnetic thin film is free from the diffraction peak for the nitride of the element M.

10. A method for fabricating a magnetic head comprising a magneto resistance head portion including a magneto resistance film and at least one magnetic shielding film, the method comprising forming a thin film comprising iron, an element M that is at least one element selected from the group consisting of magnesium, calcium, yttrium, titanium, zirconium, hafnium, vanadium, niobium, tantalum, chromium, molybdenum, tungsten, manganese, and boron, and nitrogen, the film having a I(200)/I(110) ratio of less than 0.1 with the proviso that I(200), and I(110) represents an intensity of a diffraction peak for an iron (200) plane, and an iron (110) plane, respectively, as found from an X-ray diffraction pattern;

annealing said thin film at 100 to 280° C. into a soft magnetic thin film that has a composition represented by formula $(Fe_{1-x}M_x)_{1-y}N_y$ wherein M has the same meanings as defined above, and an atomic ratio x is $0.01 \leq x \leq 0.1$ and an atomic ratio y is $0.01 \leq y \leq 0.1$, and has a I(200)/I(110) ratio of 0.1 inclusive to 1 exclusive and is substantially free from a diffraction peak for a nitride of the element M, as found from an X-ray diffraction pattern;

using said soft magnetic thin film to form at least a portion of said at least one magnetic shielding film; and forming the magnetic head according to claim 6.

11. The magnetic head according to claim 10, wherein the X-ray diffraction pattern of the soft magnetic thin film is free from the diffraction peak for the nitride of the element M.

* * * * *